United States Patent
Hsu

(10) Patent No.: US 8,672,277 B2
(45) Date of Patent: Mar. 18, 2014

(54) SCREEN SUPPORTER

(75) Inventor: Yu-Tsun Hsu, New Taipei (TW)

(73) Assignee: Jarllytec Co., Ltd., New Taipei (TW)

( * ) Notice: Subject to any disclaimer, the term of this patent is extended or adjusted under 35 U.S.C. 154(b) by 85 days.

(21) Appl. No.: 13/545,806

(22) Filed: Jul. 10, 2012

(65) Prior Publication Data

US 2013/0112818 A1    May 9, 2013

(30) Foreign Application Priority Data

Nov. 9, 2011    (TW) .............................. 100140984 A

(51) Int. Cl.
*F16L 3/00*    (2006.01)

(52) U.S. Cl.
USPC ........ 248/121; 248/276.1; 248/371; 248/923; 361/679.02

(58) Field of Classification Search
USPC ........ 248/121, 157, 278.1, 276.1, 284.1, 371, 248/923; 361/679.02; 362/402; 16/371, 16/308, DIG. 36
See application file for complete search history.

(56) References Cited

U.S. PATENT DOCUMENTS

| | | | | |
|---|---|---|---|---|
| 4,080,530 A | * | 3/1978 | Krogsrud | 362/402 |
| 4,964,152 A | * | 10/1990 | Kaul et al. | 378/198 |
| 5,339,233 A | * | 8/1994 | Yang | 362/402 |
| 5,722,513 A | * | 3/1998 | Rowan et al. | 187/269 |
| 7,188,812 B2 | * | 3/2007 | Wang | 248/276.1 |
| 7,246,784 B1 | * | 7/2007 | Lopez | 248/588 |
| 7,252,277 B2 | * | 8/2007 | Sweere et al. | 248/371 |
| 7,258,311 B2 | * | 8/2007 | Yen et al. | 248/133 |
| 7,392,965 B2 | * | 7/2008 | Jung | 248/176.3 |
| 7,726,616 B2 | * | 6/2010 | Zhang et al. | 248/284.1 |
| 7,770,856 B2 | * | 8/2010 | Depay | 248/284.1 |
| 7,810,773 B2 | * | 10/2010 | Chi | 248/278.1 |
| 8,228,668 B2 | * | 7/2012 | Asamarai et al. | 361/679.05 |
| 8,256,725 B2 | * | 9/2012 | Wang et al. | 248/157 |
| 8,570,723 B2 | * | 10/2013 | Myerchin | 361/679.05 |

* cited by examiner

*Primary Examiner* — Terrell McKinnon
*Assistant Examiner* — Daniel J Breslin
(74) *Attorney, Agent, or Firm* — Guice Patents PLLC

(57) ABSTRACT

The present invention relates to a screen supporter comprising an upper support used for fastening a screen, a base and a support arm. The support arm is pivoted with the upper support through an upper rotation shaft, and pivoted with a torque device on the base through a lower rotation shaft. When the screen and support arm are rotated for lowering the height and folded, the support arm drives a lower core shaft, the lower core shaft drives a cam of the torque device to rotate for changing the position of a contact part which compresses an elastic unit, so a proper supporting torque is generated for working with the downward-pressing torque generated by the screen at different positions thereby fully supporting the screen, and a greater downward-pressing force doesn't required to be applied for lowering the height and folding the screen, thereby saving the required force for operation.

14 Claims, 13 Drawing Sheets

SCREEN SUPPORTER

BACKGROUND OF THE INVENTION

1. Field of the Invention

The present invention relates to a screen supporter, especially to a supporter in which the supporting torque generated by a torque device being capable of working with the downward-pressing torque of a screen at different positions.

2. Description of Related Art

With the rapid development of information technology, a flat display, such as a liquid crystal display, is commonly adopted in a television or a desktop computer, or even an all-in-one desktop computer with a touch control function. The liquid crystal display has to utilize a supporter for being properly placed on a desktop for operation; for illustrating a general structure of the supporter, we take the Taiwan Patent No. M263727, titled in "Rotation axis structure with gyration and lift" granted to the applicant of the present invention, as an example, the structure includes an inclined support member, the top of the support member is pivoted with an upper rack through an upper rotation shaft, and the upper rack is fastened at the backside of a screen, so the screen is enabled to rotate relative to the support member for forwardly/backwardly adjusting the viewing angle; the bottom of the support member is pivoted with a lower rack through a lower rotation shaft, so the support member is enabled to rotate relative to the lower rack for adjusting the height of the screen, and the lower rotation shaft is installed with a torsion spring for generating supporting torque, so during the height adjustment, the downward-pressing torque generated by the weight of the screen can be balanced with the supporting torque of the lower rotation shaft, i.e. the screen can be kept at the adjusted position and height. In addition, two lateral sides of the support member are respectively installed with a pull rod, the two pull rods are combined with the upper rotation shaft and the lower rotation shaft thereby forming a parallel four-rod linkage mechanism, so the angle of the screen can be kept while the height thereof being adjusted.

Moreover, for convenient storage and package, the screen and the support member can be rotated for folding, thereby reducing the occupied space, the inclined support member is forwardly rotated through the lower rotation shaft for lowering the height so as to be in a horizontal state, the screen is backwardly rotated through the upper rotation shaft so as to be in the horizontal state, so the whole structure can be folded for reducing the package volume. However, while lowering the height of the screen, the resilience force of the torsion spring installed in the lower rotation shaft would be gradually increased, the torque is also gradually increased, so when being rotated to a lower position, a greater downward-pressing force has to be applied for completely folding, therefore the operation is not easy to be carried out. After releasing the applied force, the torsion spring which has accumulated certain amount of energy is very likely to bounce the screen, so an additional fastening process is needed for preventing the screen from bouncing. If the screen is backwardly rotated to horizontal before lowering the height, or gradually and backwardly rotated to horizontal during the height adjustment process, the gravity center of the screen will be gradually moved backwardly, the downward-pressing torque is therefore gradually reduced, or increased first then reduced later; as such, the conventional torsion spring cannot meet the requirement of adjusting the supporting torque.

SUMMARY OF THE INVENTION

One primary objective of the present invention is to provide a screen supporter in which the supporting torque, generated by a torque device capable of working with the downward-pressing torque of a screen at different positions, can be adjusted to a proper torque for fully supporting the screen, and a greater downward-pressing force does not required to be applied for lowering the height and folding the screen, thereby saving the required force for operation.

Another objective of the present invention is to provide a screen supporter, in which when a screen and a support arm being completely folded to a horizontal state, a torque device is capable of generating proper torque for preventing the screen from bouncing, so when being applied in a touch control screen, the touch control operation can still be processed while being in a lower or folded position, thereby greatly increasing the convenience in use.

For achieving the objectives, the solution provided by the present invention comprises:

an upper support, used for fastening a screen, and having at least a pivot part;

a base;

a support arm, the top thereof is formed with at least an upper pivot part, the upper pivot part is pivoted with the pivot part of the upper support through an upper rotation shaft, the upper rotation shaft includes an upper core shaft, the bottom of the support arm is formed with at least a lower pivot part, the lower pivot part is pivoted with a torque device through a lower rotation shaft, the torque device is fastened on the base through a seat member, the seat member is installed with at least an elastic unit and a slide member abutted against an outer side of the elastic unit, a cam is abutted against the slide member through a contact part, and the cam is sleeved on a lower core shaft of the lower rotation shaft thereby being enabled to synchronously rotate with the lower core shaft, and the lower core shaft is fastened on the support arm thereby being enabled to synchronously rotate with the support arm.

As such, when the screen and the support arm are rotated for folding, the height of the support arm is lowered through the rotation of the lower rotation shaft, and the lower core shaft is linked to rotate, so the lower core shaft is enabled to drive the cam to rotate for allowing the contact part thereof to push the slide member so as to compress the elastic unit thereby altering the supporting torque. Because the position of the contact part of the cam would be changed during the rotation of the cam, the force arm of the elastic force that the elastic unit applied to the contact part is also changed, the whole supporting torque is therefore altered. As such, the supporting torque generated by the torque device is capable of working with the downward-pressing torque generated by the screen at different heights for being altered and adjusted, thereby reaching a balance state.

According to one embodiment of the present invention, a lateral side of the support arm is installed with a linkage mechanism, the lower rotation shaft is installed with a hollow fasten shaft sleeved on the lower core shaft, one side of the fasten shaft is fastened on the seat member of the torque device or integrally formed with the seat member, the other side thereof is combined with the linkage mechanism through a connection shaft portion. With the installation of the linkage mechanism, the angle of the screen can be selectively altered or fixed during the height adjustment.

The linkage mechanism includes at least a connection rod, two sides of the top and the bottom of the connection rod are respectively installed with an upper linkage disc and a lower linkage disc, the upper linkage disc utilizes a shaft hole for being sleeved and fastened on the upper core shaft thereby being linked with the upper core shaft, the lower linkage disc utilizes a shaft hole for being sleeved and fastened on the connection shaft portion of the fasten shaft. At least a connection hole is respectively formed near the shaft hole of the upper linkage disc and the shaft hole of the lower linkage disc, and a first shaft pin is installed between the two upper linkage discs, the first shaft pin is fastened in the two connection holes, a third shaft pin is installed between the two lower linkage discs, the third shaft pin is fastened in the two connection holes, the top of the connection rod is pivoted with the first shaft pin, the bottom of the connection rod is pivoted with the third shaft pin. Accordingly, a parallel four-rod linkage mechanism or a nonparallel four-rod linkage mechanism is formed, so the screen can be linked for being kept at a fixed angle or gradually inclined backwardly while the height thereof being lowered.

According to one embodiment of the present invention, one side of the seat member is protrudingly formed with two pivot parts, each pivot part has a penetrated shaft hole, the lower core shaft is sleeved in the shaft holes, the lower core shaft has two planar surfaces thereby forming a noncircular cross section, and the cam is disposed between the two pivot parts and sleeved on the lower core shaft through a shaft hole having the shape same as the cross section of the lower core shaft thereby being enabled to synchronously rotate with the lower core shaft.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
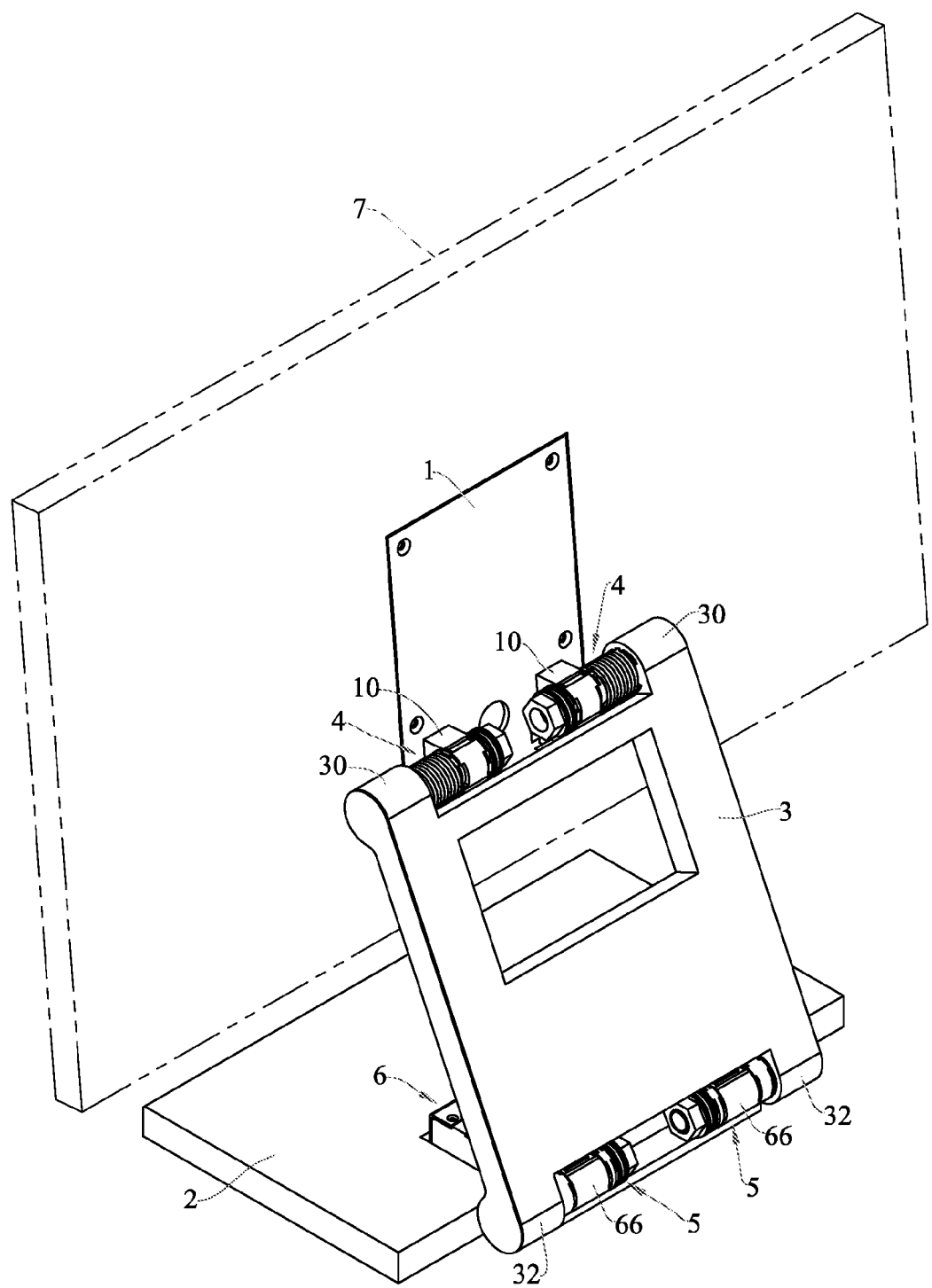
FIG. 1 is a schematic perspective view illustrating the assembly of the present invention.
Figure 2:
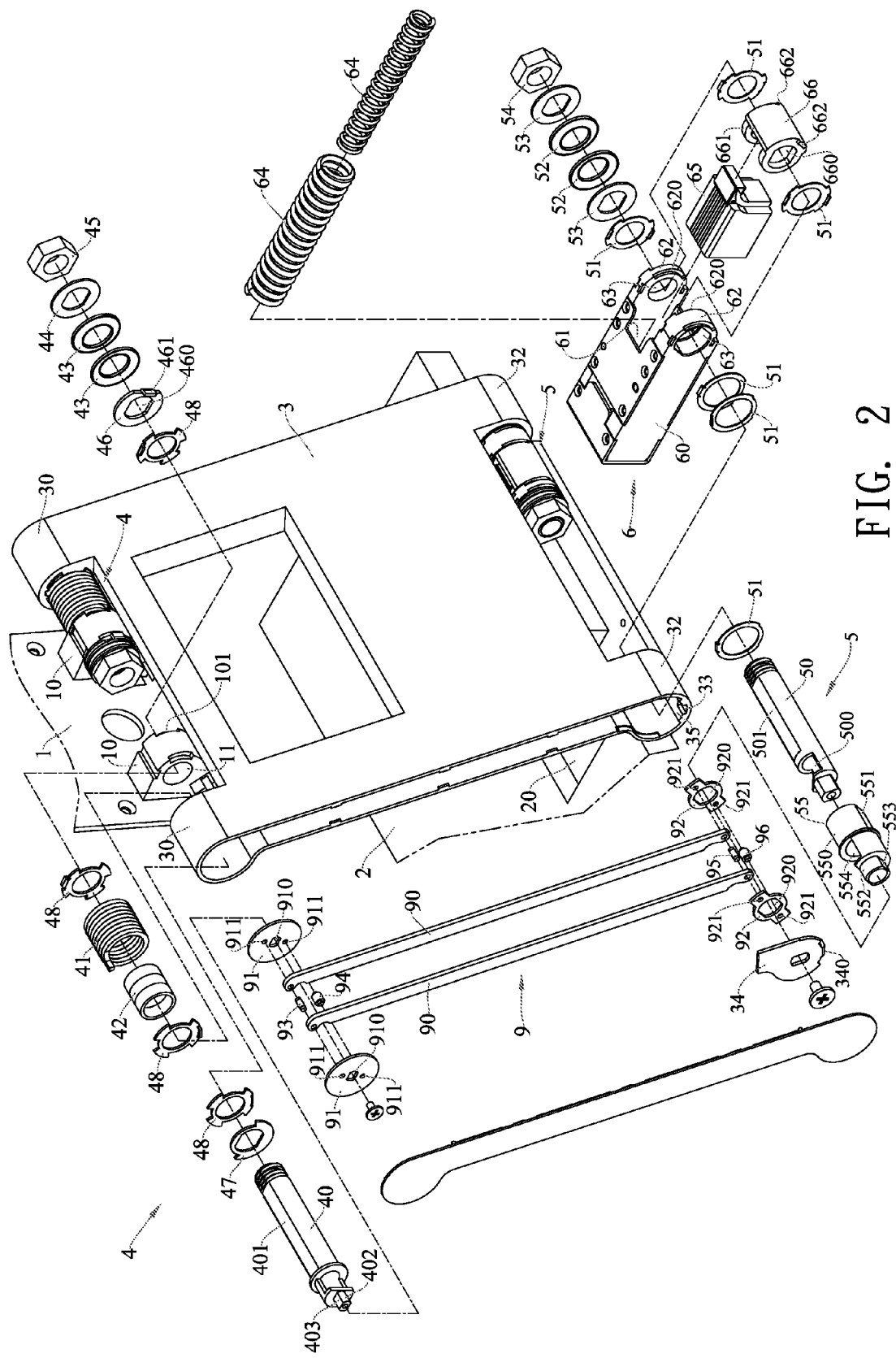
FIG. 2 is a schematic exploded view illustrating the components adopted in the present invention.
Figure 3:
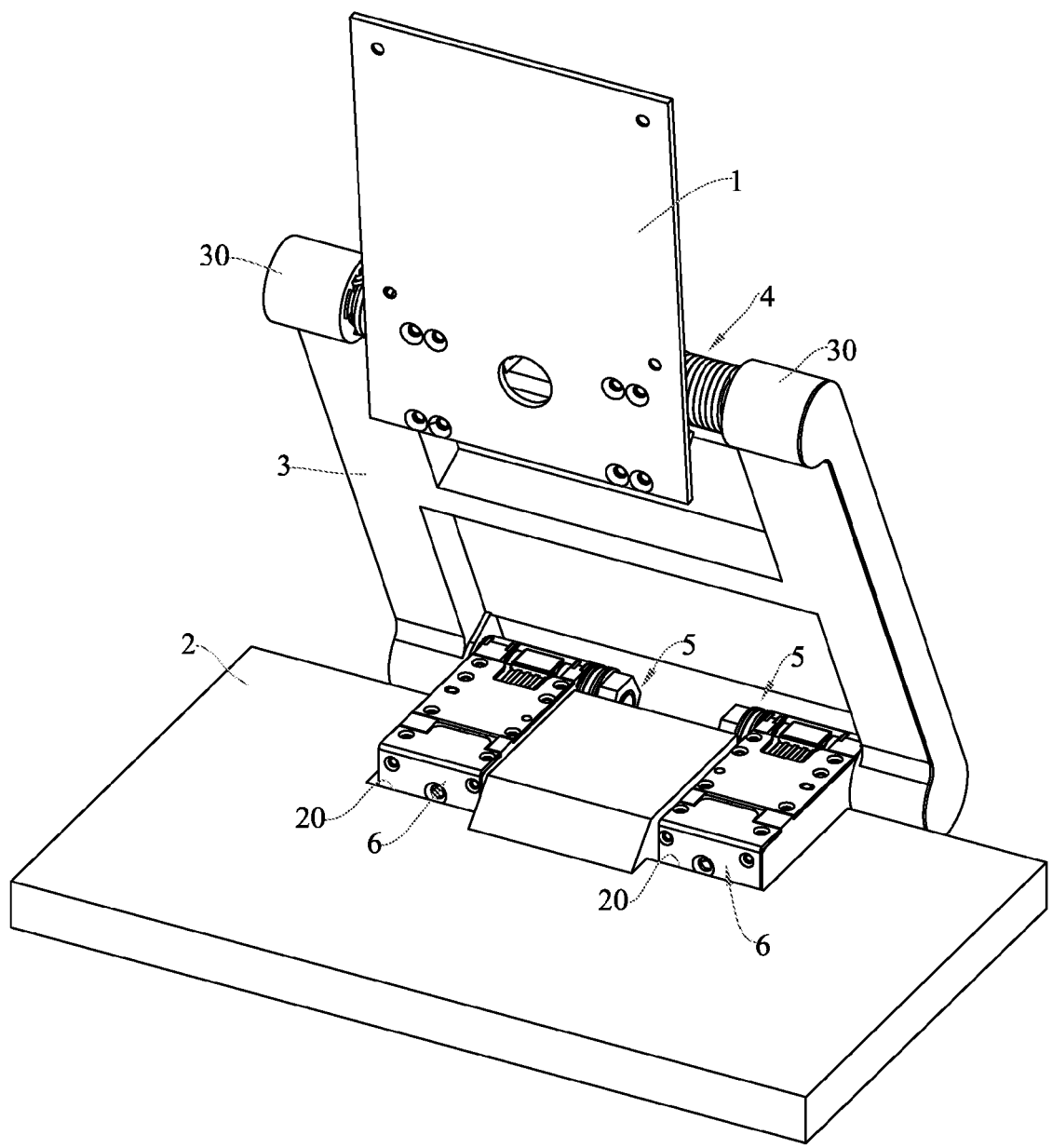
FIG. 3 is a schematic perspective view illustrating the present invention while being viewed from a different angle.
Figure 4:
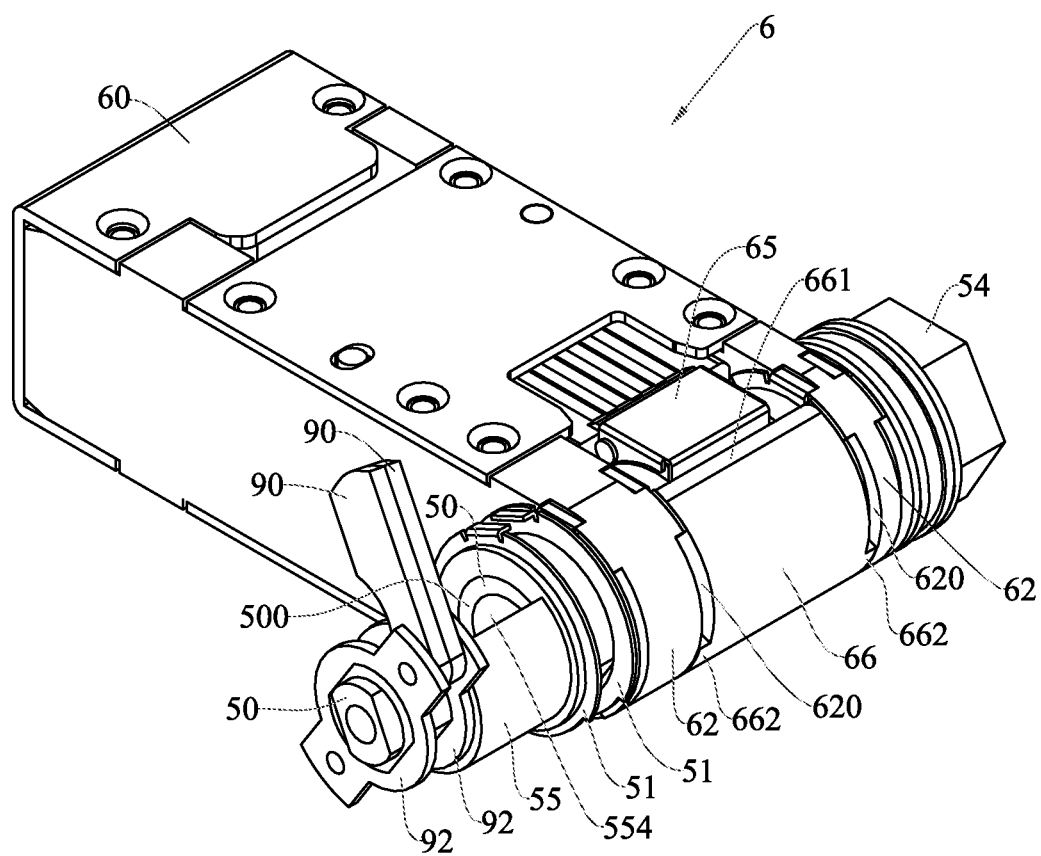
FIG. 4 is a schematic view illustrating the assembly of the lower rotation shaft and the torque device, according to the present invention.
Figure 5:
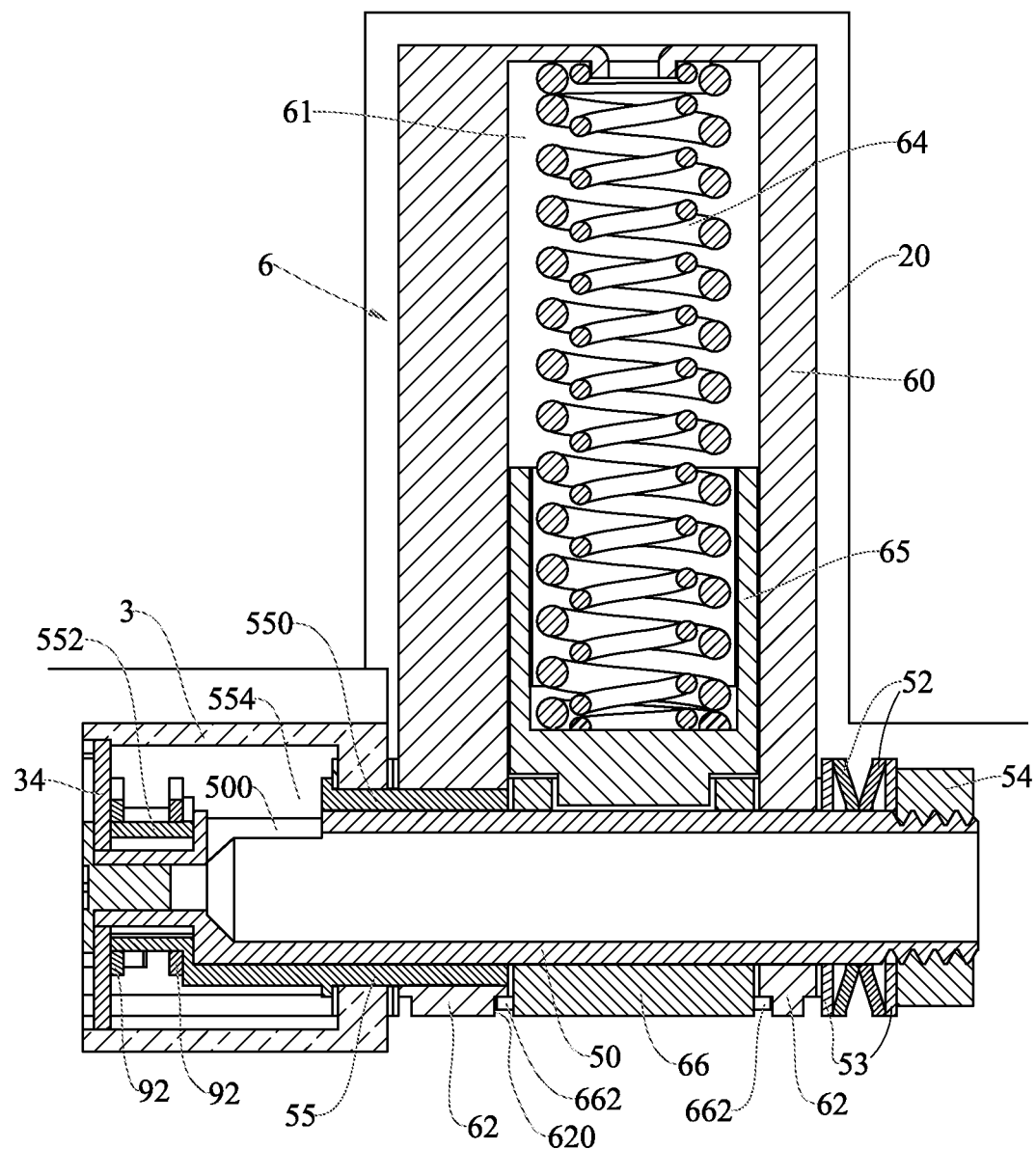
FIG. 5 is a schematic cross sectional view illustrating the lower rotation shaft and the torque device, according to the present invention.

The accompanying drawings are included to provide a further understanding of the invention, and are incorporated in and constitute a part of this specification. The drawings illustrate embodiments of the invention and, together with the description, serve to explain the principles of the invention, wherein FIG. 1 is a schematic perspective view showing the assembly of the present invention; FIG. 2 is a schematic exploded view illustrating the components adopted in the present invention; FIG. 3 is a schematic perspective view showing the assembly of the present invention while being viewed from a different angle; FIG. 4 is a schematic view illustrating the assembly of the lower rotation shaft and the torque device, according to the present invention; and FIG. 5 is a schematic cross sectional view showing the lower rotation shaft and the torque device, according to the present invention.

According to the present invention, the screen supporter comprises an upper support 1, a base 2, a support arm 3, two upper rotation shafts 4, two lower rotation shafts 5 and two torque devices 6.

The upper support 1 is used for fastening a screen 7, and is formed with two pivot parts 10 at the left and the right sides, and each pivot part 10 has a pivot hole 11.

The base 2 is formed with two accommodation areas 20 at the left and the right sides, each accommodation area 20 is respectively installed and fastened with one of the mentioned torque devices 6.

The top of the support arm 3 is protrudingly formed with two hollow upper pivot parts 30 at the left and the right sides, and an accommodation space is defined between the two upper pivot parts 30, the two pivot parts 10 of the upper support 1 are received in the accommodation space. The upper pivot parts 30 are respectively pivoted with the pivot parts 10 of the upper support 1 through the mentioned upper rotation shafts 4, so the upper support 1 is enabled to rotate relative to the support arm 3, the upper rotation shafts 4 are also received in the accommodation space defined between the two upper pivot parts 30.

The bottom of the support arm 3 is protrudingly formed with two lower pivot parts 32 at the left and the right sides, and an accommodation space is defined between the two lower pivot parts 32, the mentioned two torque devices 6 on the base 2 are received in the accommodation space defined between the lower pivot parts 32. The lower pivot parts 32 are respectively pivoted with the torque device 6 through the mentioned lower rotation shafts 5, so the support arm 3 is enabled to rotate relative to the base 2, and the lower rotation shafts 5 are also received in the accommodation space defined between the two lower pivot parts 32.

Figure 13:
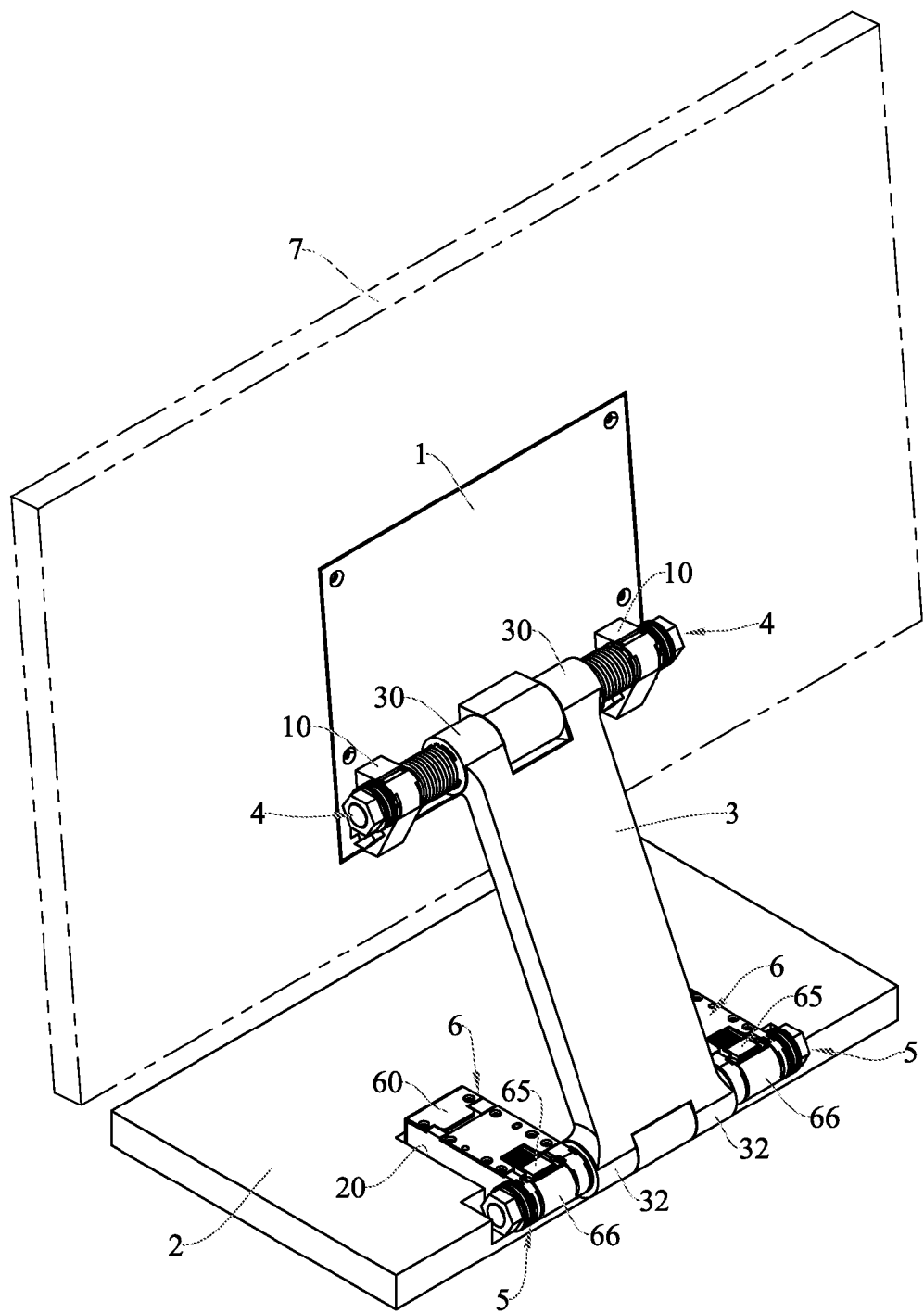
FIG. 13 is a schematic view illustrating another embodiment of the present invention.

As shown in FIG. 13, according to another embodiment of the present invention, the pivot parts 10 of the upper support 1 and the upper rotation shafts 4 can also be installed at the outer sides of the upper pivot parts 30 of the support arm 3, and the torque devices 6 and the lower rotation shafts 5 are installed at the outer sides of the lower pivot parts 32, such that the width of the support arm 3 can be reduced and a different appearance is also provided.

Referring from FIG. 2 to FIG. 6, the torque devices 6 respectively utilize a seat member 60 for being fastened in the accommodation areas 20 of the base 2, the seat member 60 has a horizontal accommodation space 61, one side of the seat member 60 is protrudingly formed with two pivot parts 62, each pivot part 62 has a penetrated shaft hole 63, wherein one shaft hole 63 is formed as a noncircular hole, the other shaft hole 63 is formed as a circular hole. The accommodation space 61 is installed with two elastic units 64 and a slide member 65 abutted against the outer sides of the elastic units 64, the two elastic units 64 are two compression springs having different outer diameters, the compression spring having the smaller outer diameter is sleeved in the compression spring having the larger outer diameter.

Each lower rotation shaft 5 is formed with a lower core shaft 50 passing the lower pivot part 32 of the support arm 3 and the shaft hole 63 of the seat member 60, one side of the lower core shaft 50 is fastened with a fasten plate 34, and the fasten plate 34 utilizes a tenon 340 for being mounted in a recessed slot 33 formed at one lateral side of the lower pivot part 32, thereby being combined at the lateral side of the lower pivot part 32 and being enabled to synchronously rotate with the support arm 3, so the lower core shaft 50 is enabled to synchronously rotate with the support arm 3. The lower core shaft 50 is hollow and radially formed with a notch 500 communicating to the hollow portion thereby facilitating the wiring layout; for an all-in-one desktop computer, the mainframe thereof is installed on the base 2, so a signal wire can be connected to the mainframe on the base 2 through passing the hollow lower core shaft 50 from the notch 500.

The lower core shaft 50 is formed with two planar surfaces 501 thereby forming a noncircular cross section, and a cam 66 is installed between the two pivot parts 62 and is sleeved with the lower core shaft 50 through a shaft hole 660 having the same cross section as the lower core shaft 50, thereby being enabled to synchronously rotate with the lower core shaft 50. The cam 66 has a protruding contact part 661 abutted against the slide member 65 for mutually pushing. Two lateral sides of the cam 66 respectively have a protrusion 662, and lateral sides of the pivot parts 62 of the seat member 60 are respectively formed with an arc-shaped position limiting slot 620, the protrusions 662 are disposed in the position limiting slots 620 so as to be stopped and positioned at two sides of the position limiting slots 620. When the support arm 3 drives the lower core shaft 50 to counterclockwise rotate towards the horizontal direction, the lower core shaft 50 drives the cam 66 to counterclockwise rotate, so the protrusions 662 are enabled to rotate in the arc-shaped position limiting slots 620, when the support arm 3 is rotated to a horizontal folding position, the protrusions 662 are stopped at one side of the arc-shaped position limiting slots 620 thereby being positioned.

The lower core shaft 50 is sleeved with plural fiction plates 51, two arc-shaped elastic plates 52 and washers 53, and a nut 54 is provided for locking the distal end. The plural friction plates 51 are respectively fastened in mount slots at two sides of the pivot parts 62 of the seat member 60 and in mount slots of the lower pivot parts 32 of the support arm 3 through tenons, thereby providing a wearing resistant effect, wherein the friction plate 51 disposed between the pivot part 62 and the support arm 3 is sleeved on a hollow fasten shaft 55, and the fasten shaft 55 is sleeved at the outer side of the lower core shaft 50.

As such, when the height of the support arm 3 is lowered through the rotation of the lower rotation shaft 5, the fasten plate 34 rotates with the support arm 3 so as to drive the lower core shaft 50 to synchronously rotate, then the lower core shaft 50 drives the cam 66 to rotate for changing the position of the contact part 661, and the slide member 65 is driven to slide for compressing or releasing the elastic units 64.

Figure 6:
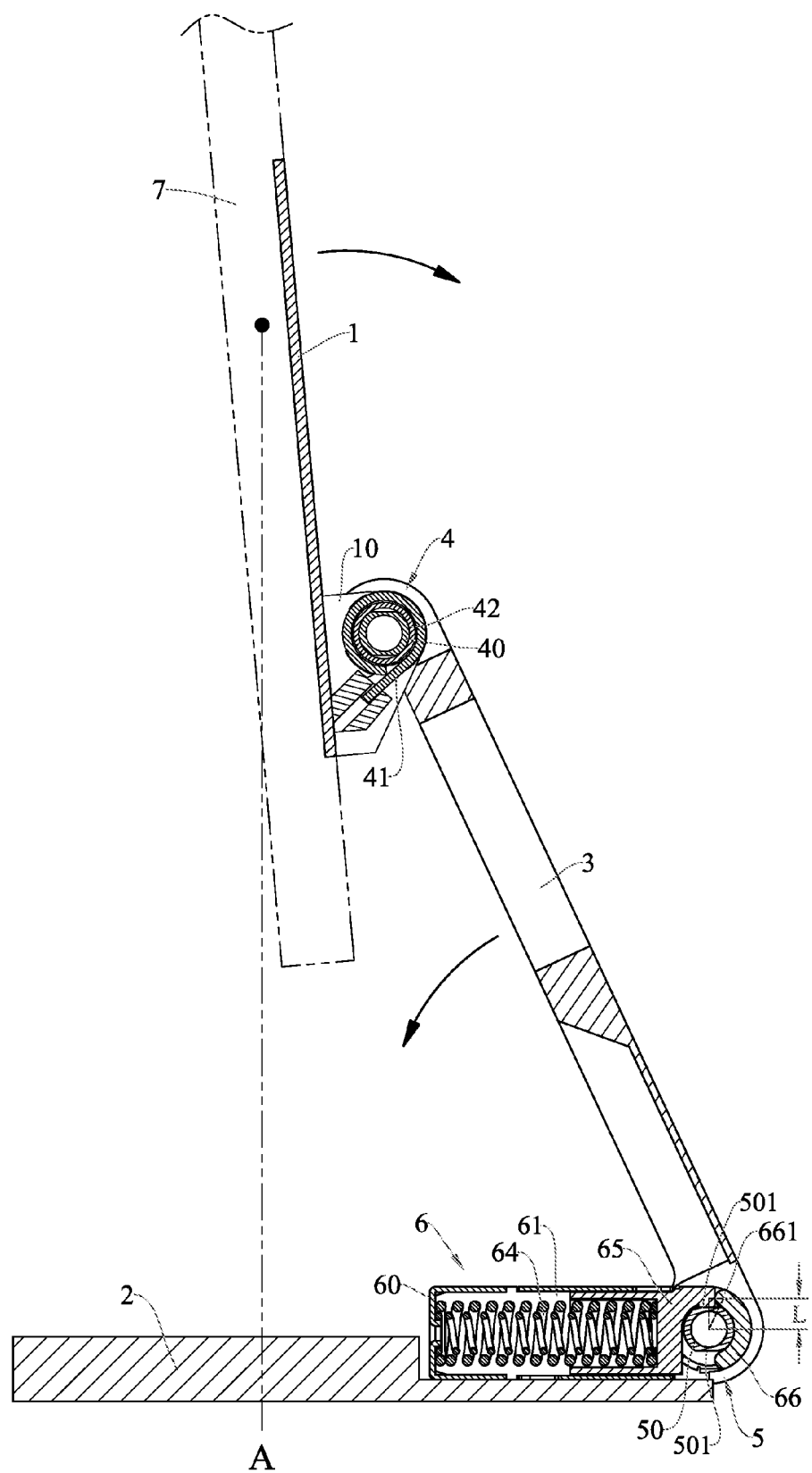
FIG. 6 is a schematic cross sectional view illustrating the screen being at the highest position, according to the present invention.
Figure 7:
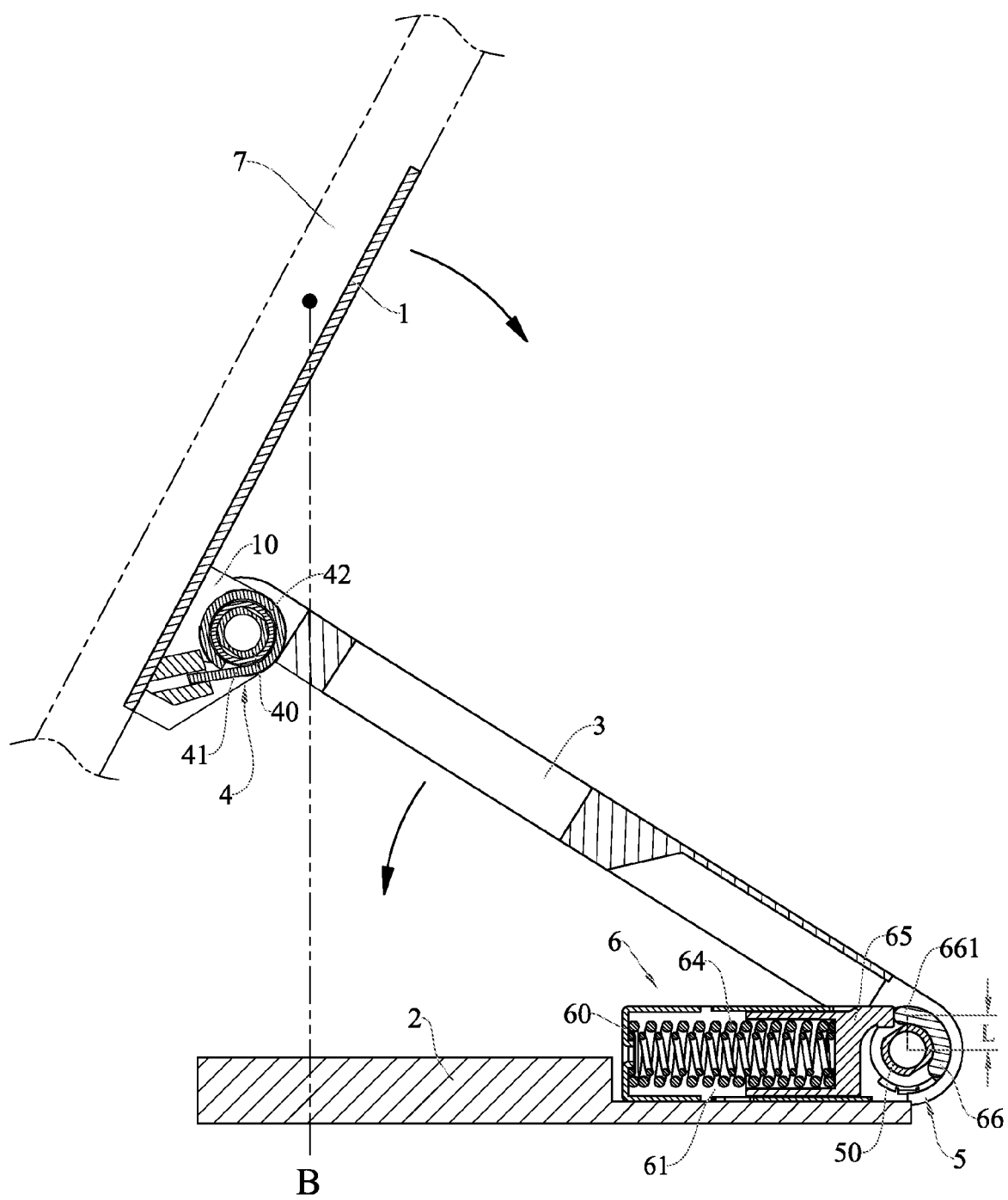
FIG. 7 is a schematic view illustrating the action of the screen and the support arm being rotated for folding, according to the present invention.
Figure 8:
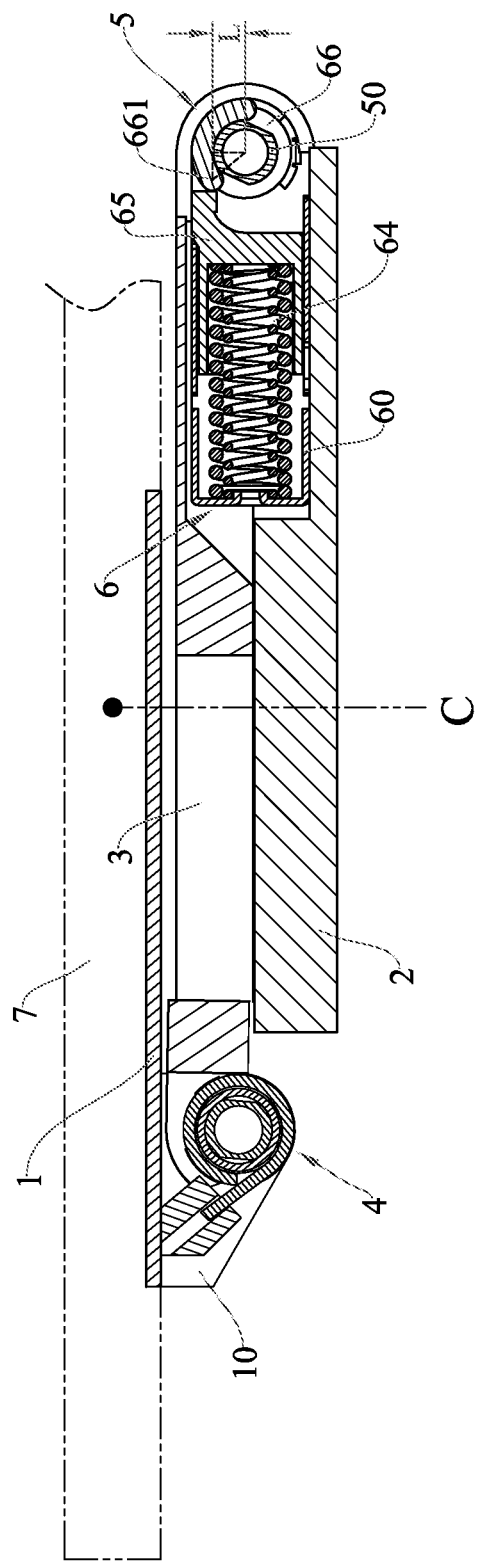
FIG. 8 is a schematic view illustrating the screen and the support arm being completely folded, according to the present invention.

Referring from FIG. 6 to FIG. 8, FIG. 6 discloses the screen is at the highest position, and the support arm 3 is in an inclined state, the gravity center of the screen 7 is defined at the location A, the contact part 661 of the cam 66 is abutted against the front of the slide member 65, and the contact part 661 is located behind the central shaft line of the lower core shaft 50. When the screen 7 is downwardly pressed for adjusting the height, the support arm 3 counterclockwise rotates through the lower rotation shaft 5, as shown in FIG. 7, according to the structure disclosed in this embodiment, the screen 7 gradually and backwardly rotates while the height thereof being lowered, thus the gravity center is also gradually moved backwardly, the structure and action will be illustrated later, at this moment, the gravity center of the screen is defined at the location B, the force arm is therefore elongated and the downward-pressing torque generated by the screen is also increased. When the support arm 3 downwardly rotates, the fasten plate 34 is driven to rotate, so the fasten plate 34 is enabled to drive the lower core shaft 50 to rotate, and the lower core shaft 50 drives the cam 66 to rotate, the position of the contact part 661 is therefore changed and rotated to be above the central shaft line of the lower core shaft 50, and the slide member 65 is abutted to move thereby compressing the elastic units 64. At this moment, the resilience force of the elastic units 64 is increased, and the force arm L of the contact part 661 is elongated, so the torque generated by the torque device 6 is increased thereby capable of working with the downward-pressing torque generated by the screen.

Referring to FIG. 8, when the screen 7 and the support arm 3 are both rotated to the horizontal folding state, the gravity center of the screen is defined at the location C, because the force arm is shortened, the downward-pressing torque is also reduced. Meanwhile, the contact part 661 of the cam 66 is rotated to be in front of the central shaft line of the lower core shaft 50, thereby continuously pushing the slide member 65 to compress the elastic units 64, at this moment, the force arm L of the contact part 661 is shortened, so the torque generated by the torque device 6 is also reduced, thereby capable of working with the downward-pressing torque generated by the screen for reaching a balance state. As such, the operation of lowering the height and folding the screen does not require too much external downward-pressing force, thereby saving the required force for operation. In addition, when the screen is in the horizontal folding state, the torque device 6 generates proper torque for preventing the screen from bouncing, so when being applied in a touch control screen, the touch control operation can still be processed while being in a lower or folded position, thereby greatly increasing the convenience in use.

According to the present invention, the supporting torque of the torque device can be altered through changing the initial position of the contact part, thereby capable of working with different functions of the screen.

Referring to FIG. 2, the lower rotation shaft 5 of the present invention further includes a fasten shaft 55, the fasten shaft 55 is combined or integrally formed with the seat member 60 of the torque device 6, so the fasten shaft 55 can be fixed. The fasten shaft 55 is hollow, and sleeved at the outer side of the lower core shaft 50. The fasten shaft 55 has a fasten shaft portion 550, the fasten shaft portion 550 has two planar surfaces 551 thereby forming a noncircular cross section, the fasten shaft portion 550 is installed in the noncircular shaft hole 63 of the pivot part 62 of the seat member 60, the shape of the shaft hole 63 is the same as the cross section of the fasten shaft portion 550, the fasten shaft 55 and the seat member 60 are fastened on the base 2 thereby forming a fixed unit, the lower core shaft 50 and the support arm 3 are linked for forming a rotary unit. The fasten shaft 55 further includes a connection shaft portion 552, the connection shaft portion 552 also has two planar surfaces 553 for forming a noncircular cross section. Corresponding to the position where the notch 500 is formed on the lower core shaft 50, the fasten shaft 55 is formed with a radial notch 554 communicating with the notch 500 of the lower core shaft, thereby facilitating the wiring layout.

Each upper rotation shaft 4 includes an upper core shaft 40 installed on the upper pivot part 30 of the support arm 3 and the pivot hole 11 of the pivot part 10 of the upper support 1. The upper core shaft 40 has two planar surfaces 401 thereby forming a noncircular cross section, and one side of the upper core shaft 40 is formed with a connection shaft portion 402, the connection shaft portion 402 also has two planar surfaces 403 thereby forming a noncircular cross section. The upper core shaft 40 is sleeved with a torsion spring 41 having two ends respectively mounted in the pivot part 10 of the upper support 1 and the upper pivot part 30 of the support arm 3, so when the screen is rotated relative to the support arm 3 for adjusting the inclined angle, a torque can be provided for supporting the screen. For avoiding the interference between the upper core shaft 40 and the torsion spring 41 while being compressed, a sleeve tube 42 sleeved on the upper core shaft 40 is provided in the torsion spring 41. The upper core shaft 40 is sleeved with plural friction plates 48, two arc-shaped elastic plates 43 and a washer 44, and a nut 45 is provided for locking the distal end. The friction plates 48 respectively utilize a tenon for being mounted at two sides of the pivot part 10 of the upper support 1 and at two sides of the upper pivot part 30 of the support arm 3, thereby providing a wearing resistant effect. The upper core shaft 40 is hollow, and radially formed with a notch communicating with the hollow portion, thereby facilitating the wiring layout.

Figure 9:
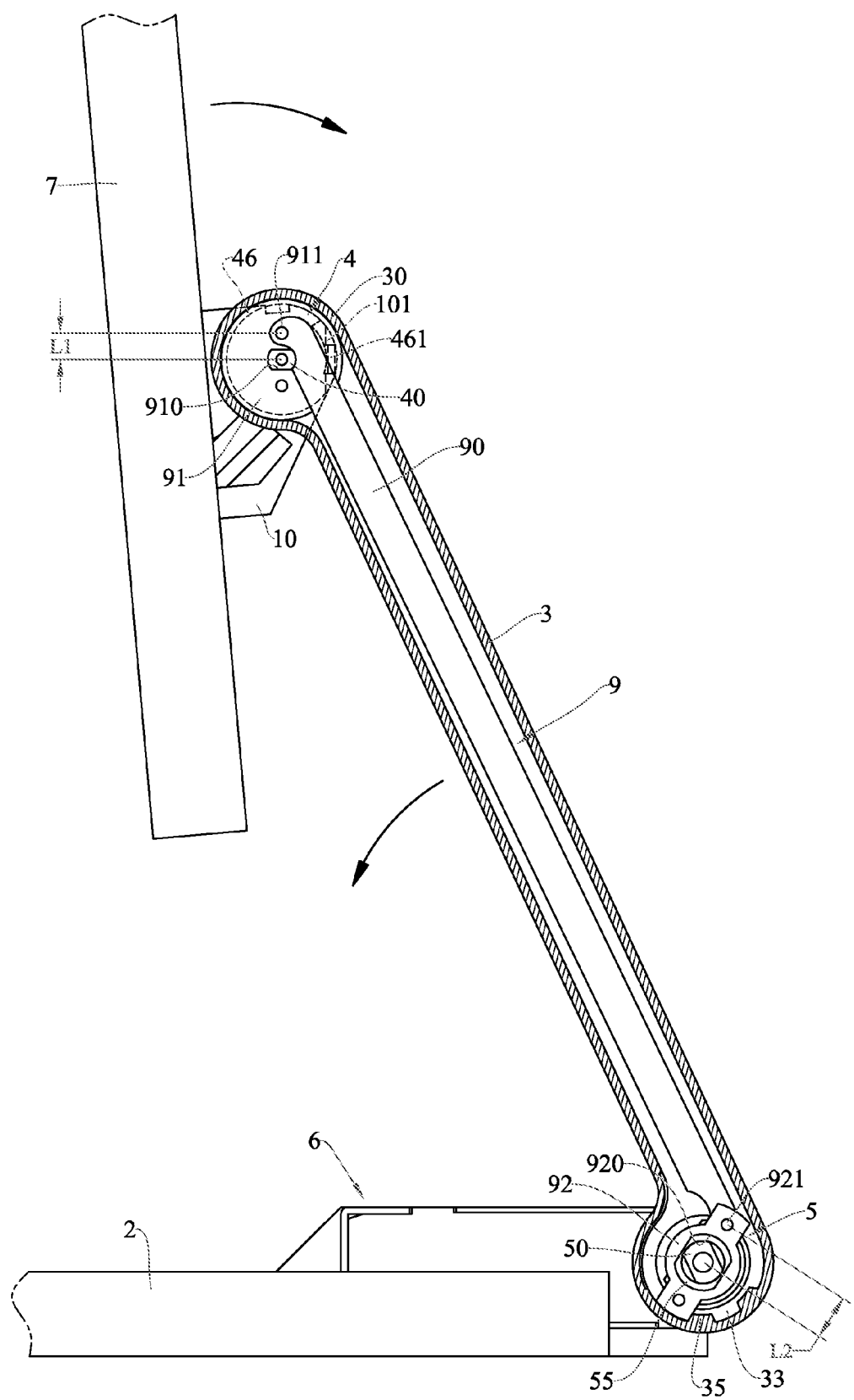
FIG. 9 is a schematic view illustrating the linkage mechanism while the screen being at the highest position, according to the present invention.
Figure 10:
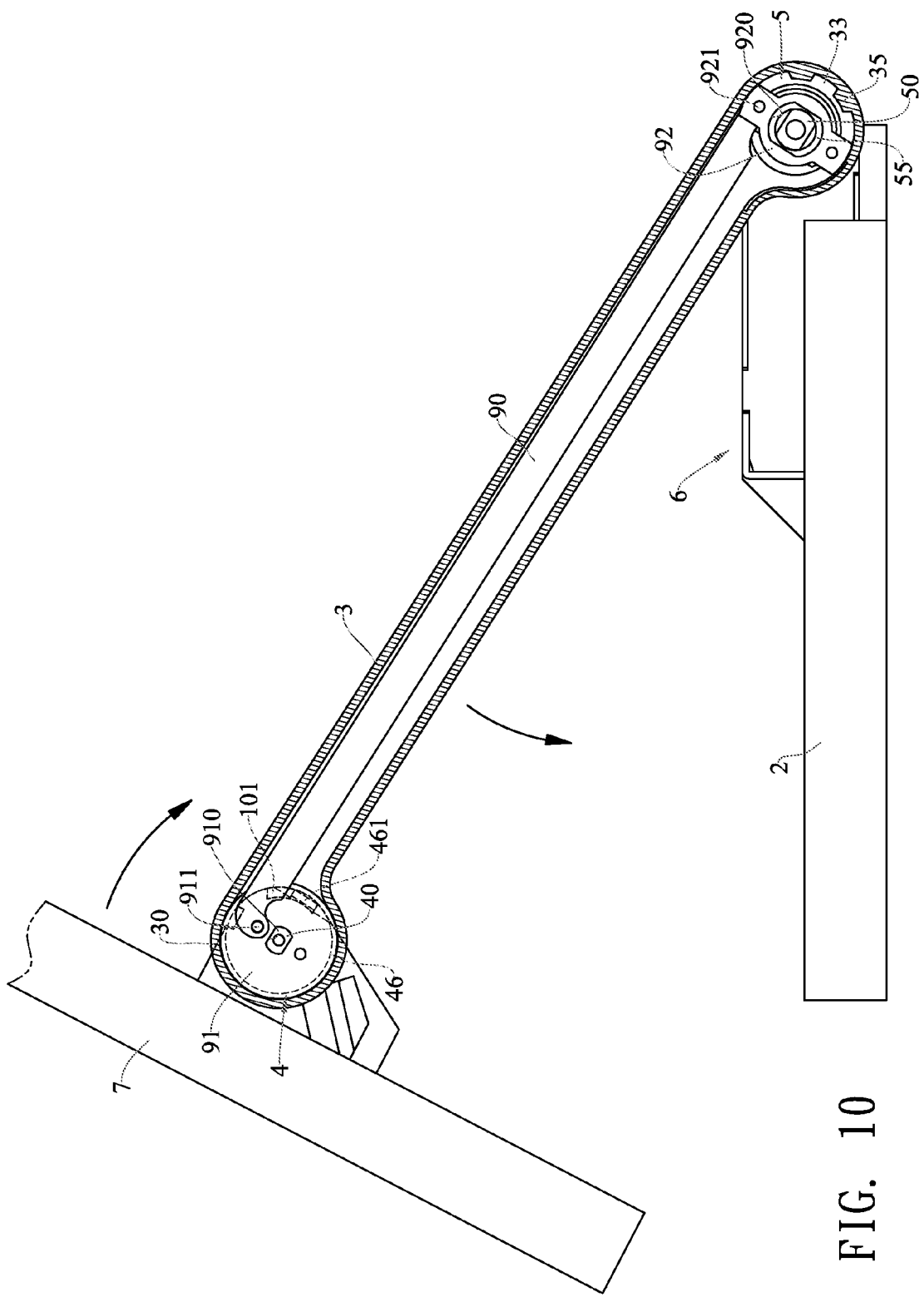
FIG. 10 is a schematic view illustrating the action of the linkage mechanism during the folding process of the screen and the support arm.
Figure 11:
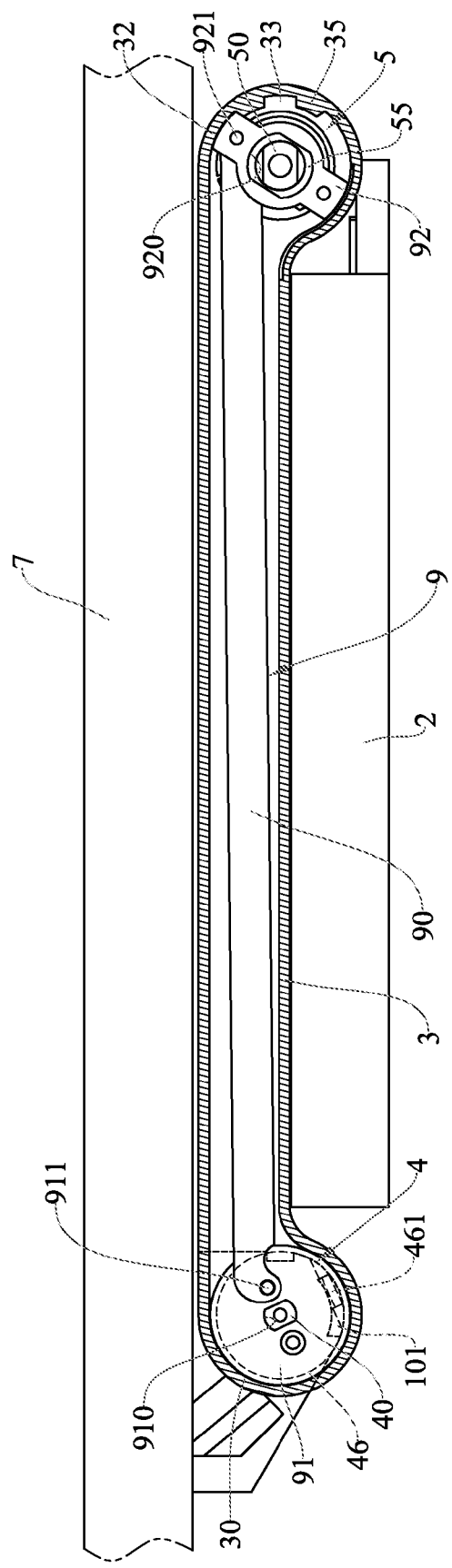
FIG. 11 is a schematic view illustrating the action of the linkage mechanism while the screen and the support arm being completely folded, according to the present invention.

Referring to FIG. 2 and FIG. 9, the accommodation spaces at two sides of the support arm 3 are respectively installed with a linkage mechanism 9, and the outer side is installed with a lateral cover. The linkage mechanism 9 is a nonparallel four-rod linkage mechanism, and includes two connection rods 90, wherein outer sides of the tops and the bottoms of the two connection rods 90 are respectively installed with an upper linkage disc 91 and a lower linkage disc 92. The two upper linkage discs 91 respectively have a shaft hole 910 for being sleeved and fastened on the connection shaft portion 402 of the upper core shaft 40, thereby being enabled to synchronously rotate with the upper core shaft 40. The shaft hole 910 is formed with two connection holes 911 at two sides, the distance between the connection hole 911 and the center of the shaft hole 910 is defined as L1, as shown in FIG. 9. A first shaft pin 93 and a second shaft pin 94 are installed between the two upper linkage discs 91, and the two shaft pins 93, 94 are respectively fastened in the two connection holes 911.

The two lower linkage discs 92 respectively utilize a shaft hole 920 for being sleeved and fastened on the connection shaft portion 552 of the fasten shaft 55, thereby being enabled to synchronously rotate with the fasten shaft 55. The shaft hole 920 is formed with two connection holes 921 at two sides, the distance between the connection hole 921 and the center of the shaft hole 920 is defined as L2, and the L2 is greater than the L1. A third shaft pin 95 and a fourth shaft pin 96 are installed between the two lower linkage discs 92, and the two shaft pins 95, 96 are respectively fastened in the two connection holes 921. The tops of the two connection rods 90 respectively utilize a hole for being sleeved on the first shaft pin 93, and the bottoms of the connection rods 90 respectively utilize a hole for being sleeved on the third shaft pin 95.

As such, a four-rod linkage mechanism is established by the connection rod 90, the upper rotation shaft 4, the lower rotation shaft 5 and the support arm 3, because the distance L1 defined between the connection hole 911 and the center of the shaft hole 910 of the upper linkage disc 91 is smaller than the distance L2 defined between the connection hole 921 and the center of the shaft hole 920 of the lower linkage disc 92, thereby forming a nonparallel four-rod linkage mechanism.

The upper core shaft 40 is further sleeved with a stop plate 46, the stop plate 46 is sleeved on the upper core shaft 40 through a shaft hole 460 having the shape same as the cross section of the upper core shaft 40, thereby being enabled to synchronously rotate with the upper core shaft 40. The stop plate 46 has a protruding stop block 461, and the pivot part 10 of the upper support 1 is formed with an arc-shaped recessed slot 101, the stop block 461 is disposed in the arc-shaped recessed slot 101 and capable of stopping at two sides of the arc-shaped recessed slot 101, thereby serving as a limitation for the inclined angle adjustment of the upper support 1, wherein the range thereof is about 30 degrees. Meanwhile, when the upper core shaft 40 rotates, the stop plate 46 also synchronously rotates, thereby changing the stopping position.

As such, when the screen is at the highest position, with the limitation provided by the stop plate 46, the screen can only be forwardly/backwardly adjusted within the range of 30 degrees, and cannot be clockwise rotated backwardly for being in the horizontal state, thereby eliminating the concern of unstable gravity center. If the screen 7 is desired to be rotated backwardly for folding, the support arm 3 has to be rotated for lowering the height. At this moment, the screen 7 is downwardly pressed so the support arm 3 is enabled to counterclockwise rotate for lowering the height, with the nonparallel four-rod linkage mechanism 9, the top of the connection rod 90 drives the upper linkage disc 91 to reversely rotate in the clockwise direction, and the upper core shaft 40 is driven to rotate on the upper pivot part 30 of the support arm 3, meanwhile the stop plate 46 is driven to reversely rotate in the clockwise direction; so the stopping position of the stop block 461 is changed, and the screen can be further rotated in the clockwise direction, as such, the stopping position of the stop plate 46 is gradually changed, and the screen is enabled to be gradually and clockwise folded towards the horizontal direction.

When the screen and the support arm are continuously rotated towards the horizontal direction, because the cam 66 synchronously rotates with the lower pivot part 32 of the support arm 3, when the protrusions 662 at two sides of the cam 66 are rotated and stopped in the arc-shaped position limiting slots 620 at the lateral sides of the pivot parts 62 of the seat member 60, the support arm 3 is rotated to the folding position thereby being positioned.

Figure 12:
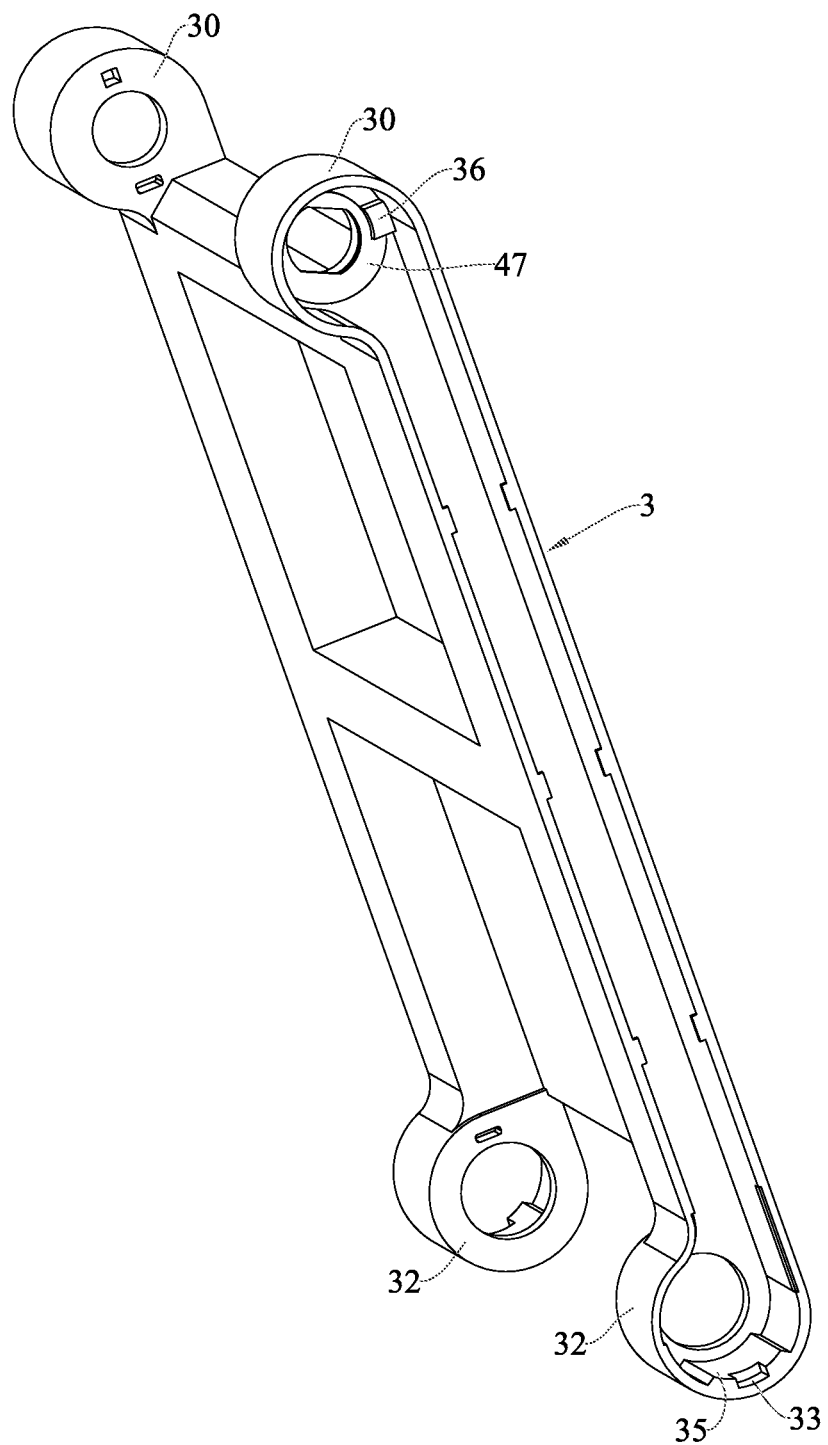
FIG. 12 is a schematic view illustrating the position limiting while the support arm being rotated to the highest position, according to the present invention.

The upper core shaft 40 is additionally sleeved with a position limiting plate 47 which can form the position limiting with a stop block 36 inside the upper pivot part 30 while the support arm 3 being rotated to the highest position, as shown in FIG. 12. When the support arm 3 is clockwise rotated for being unfolded from the folding state, with the linkage mechanism 9 at the lateral side of the support arm 3, the upper linkage disc 91 drives the upper core shaft 40 to counterclockwise rotate, the upper core shaft 40 drives the position limiting plate 47 to counterclockwise rotate and be stopped by the stop block 36 of the upper pivot part 30 while being at the highest position thereby being positioned. Meanwhile, a protrusion piece 35 inside the lower pivot part 32 is also stopped at the lower linkage disc 92 thereby forming position limiting, as shown in FIG. 9

The mentioned linkage mechanism 9 is not limited to the nonparallel four-rod linkage mechanism, the mentioned linkage mechanism 9 can also be a parallel four-rod linkage mechanism, or a mechanism utilizing belts and pulleys, or chains and wheels for linking the upper rotation shaft 4 and the lower rotation shaft 5.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A screen supporter, comprising: an upper support, used for fastening a screen, and having at least a pivot part;
a base;
a support arm, the top thereof being formed with at least an upper pivot part, said upper pivot part being pivoted with said pivot part of said upper support through an upper rotation shaft, said upper rotation shaft including an upper core shaft, the bottom of said support arm being formed with at least a lower pivot part, said lower pivot part being pivoted with a torque device through a lower rotation shaft, said torque device being fastened on said base through a seat member, said seat member being installed with at least an elastic unit and a slide member abutted against an outer side of said elastic unit, a cam being abutted against said slide member through a contact part, and said cam being sleeved on a lower core shaft of said lower rotation shaft thereby being enabled to synchronously rotate with said lower core shaft, and said lower core shaft being fastened on said support arm thereby being enabled to synchronously rotate with said support arm;
wherein said lower rotation shaft is installed with a hollow fasten shaft sleeved on said lower core shaft, and a lateral side of said support arm is installed with a linkage mechanism, one side of said fasten shaft is fastened on said seat member of said torque device or integrally formed with said seat member, the other side thereof is combined with said linkage mechanism through a connection shaft portion.

2. The screen supporter as claimed in claim 1, wherein said fasten shaft is formed with a fasten shaft portion, said fasten shaft portion has two planar surfaces thereby forming a noncircular cross section, said seat member is formed with a shaft hole having the same shape as the cross section of said fasten shaft portion, said fasten shaft portion and said lower core shaft are sleeved in said shaft hole, and said fasten shaft and said shaft hole are fixed.

3. The screen supporter as claimed in claim 1, wherein said linkage mechanism includes at least a connection rod, two sides of the top and the bottom of said connection rod are respectively pivoted with an upper linkage disc and a lower linkage disc, said upper linkage disc utilizes a shaft hole for being sleeved and fastened on said upper core shaft thereby being linked with said upper core shaft, said lower linkage disc utilizes a shaft hole for being sleeved and fastened on said connection shaft portion of said fasten shaft.

4. The screen supporter as claimed in claim 3, wherein at least a connection hole is respectively formed near said shaft hole of said upper linkage disc and said shaft hole of said lower linkage disc, and a first shaft pin is installed between said two upper linkage discs, said first shaft pin is fastened in said two connection holes, a third shaft pin is installed between said two lower linkage discs, said third shaft pin is fastened in said two connection holes, the top of said connection rod is pivoted with said first shaft pin, the bottom of said connection rod is pivoted with said third shaft pin.

5. The screen supporter as claimed in claim 4, wherein the distance between said connection hole and the center of said shaft hole of said lower linkage disc is greater than the distance between said connection hole and the center of said shaft hole of said upper linkage disc.

6. The screen supporter as claimed in claim 5, wherein said upper core shaft has two planar surfaces thereby forming a noncircular cross section, said upper core shaft is sleeved with a stop plate, said stop plate is sleeved on said upper core shaft through a shaft hole having the same shape as the cross section of said upper core shaft thereby being enabled to synchronously rotate with said upper core shaft, said stop plate has a protruding stop block, and said pivot part of said upper support is formed with an arc-shaped recessed slot, said stop block is disposed in said arc-shaped recessed slot and stopping at two sides of said arc-shaped recessed slot.

7. The screen supporter as claimed in claim 1, wherein one side of said seat member is protrudingly formed with two pivot parts, each pivot part has a penetrated shaft hole, said lower core shaft is sleeved in said shaft holes and said lower pivot part of said support arm, said lower core shaft has two planar surfaces thereby forming a noncircular cross section, and said cam is disposed between said two pivot parts and sleeved on said lower core shaft through a shaft hole having the shape same as the cross section of said lower core shaft thereby being enabled to synchronously rotate with said lower core shaft.

8. The screen supporter as claimed in claim 7, wherein two lateral sides of said cam respectively have a protrusion, and lateral sides of said pivot parts of said seat member are respectively formed with an arc-shaped position limiting slot, said protrusions are disposed in said position limiting slots so as to be stopped and positioned at two sides of said position limiting slots.

9. The screen supporter as claimed in claim 1, wherein one side of said lower core shaft is fastened with a fasten plate, and said fasten plate utilizes a tenon for being mounted in a recessed slot formed at one lateral side of said lower pivot part.

10. The screen supporter as claimed in claim 1, wherein said lower core shaft is hollow and radially formed with a notch communicating to the hollow portion, thereby facilitating the wiring layout; corresponding to the position where said notch is formed on said lower core shaft, said fasten shaft is formed with a radial notch communicating with said notch of said lower core shaft.

11. The screen supporter as claimed in claim 1, wherein said upper core shaft is hollow and radially formed with a notch communicating to the hollow portion, thereby facilitating the wiring layout.

12. The screen supporter as claimed in claim 1, wherein said upper pivot parts of said support arm are protrudingly formed at the left and the right sides at the top of said support arm and formed as hollow, and an upper accommodation space is defined between said two upper pivot parts, said pivot part of said upper support and said upper rotation shaft are received in said upper accommodation space; said lower pivot parts of said support arm are protrudingly formed at the left and the right sides at the bottom of said support arm, and a lower accommodation space is defined between said two lower pivot parts, said torque device on said base and said lower rotation shaft are received in said lower accommodation space defined by said lower pivot parts.

13. The screen supporter as claimed in claim 1, wherein said support arm is formed with two protruding upper pivot parts and two protruding lower pivot parts, said pivot part of said upper support and said upper rotation shaft are installed at the outer sides of said upper pivot parts, and said torque device and said lower rotation shaft are installed at the outer sides of said lower pivot parts.

14. The screen supporter as claimed in claim 1, wherein said upper core shaft is fastened with a position limiting plate, said position limiting plate works with a stop block inside said upper pivot part of said support arm for mutually stopping, thereby forming the position limiting while said support arm is being rotated to the highest position.

* * * * *